Oct. 21, 1969   A. ALFORD   3,474,336
SIGNAL TRANSMISSION COMPARISON WITH HYBRID COMBINING MEANS
Filed Oct. 27, 1964
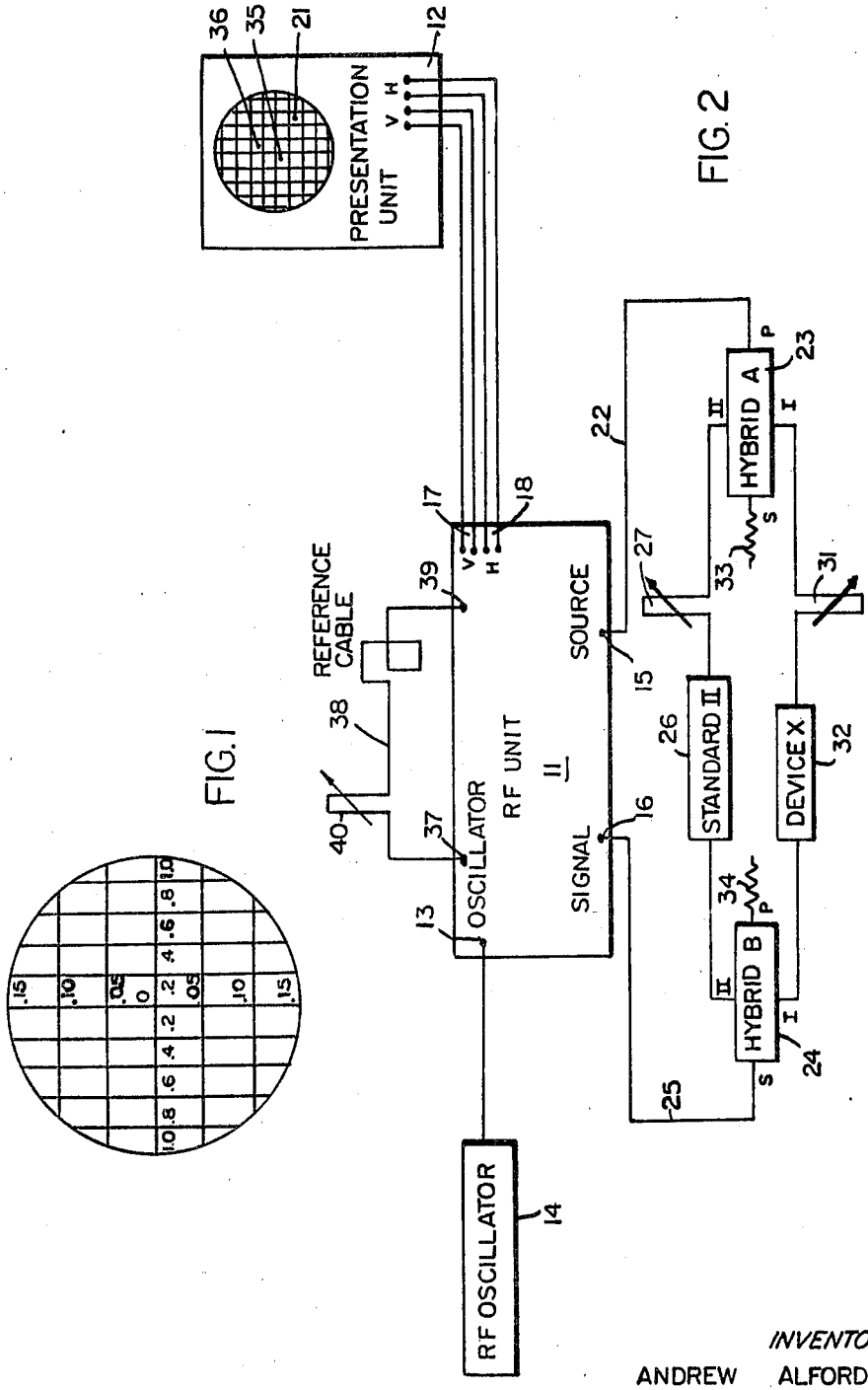
INVENTOR
ANDREW ALFORD
BY
Wolf, Greenfield + Hieken
ATTORNEYS

United States Patent Office 3,474,336
Patented Oct. 21, 1969

3,474,336
SIGNAL TRANSMISSION COMPARISON WITH HYBRID COMBINING MEANS
Andrew Alford, Winchester, Mass. 02110
(299 Atlantic Ave., Boston, Mass.)
Filed Oct. 27, 1964, Ser. No. 406,836
Int. Cl. G01r 27/04
U.S. Cl. 324—58                                    19 Claims

ABSTRACT OF THE DISCLOSURE

A hybrid power divider delivers substantially equal amounts of energy to a reference channel containing a standard and an unknown channel containing an unknown device for determining small differences between the signal transmission characteristics of the standard and unknown devices. Both the reference and unknown channels include a line stretcher for selectively adjusting the phase shift introduced by each channel. The output of each channel is coupled to a respective side branch of a combining hybrid that also has series and parallel branches. One of the parallel and series branches is terminated and the other delivers a signal for display on an oscilloscope of a signal representative of the slight difference in attenuation and phase between the standard device and the unknown device.

---

The present invention relates in general to the comparison of signal transmission characteristics and more particularly concerns a novel high resolution device capable of accurately indicating minute differences in phase and attenuation characteristics between a given device as compared to a corresponding standard.

For many years Alford Manufacturing Company automatic impedance and transfer characteristic plotters have provided automatic means for measuring and plotting R-F phase shift, insertion loss or gain, and complex impedance or admittance as a continuous function of frequency. Such plotters have met with wide acceptance in Government and industry. While these plotters make absolute measurements with high accuracy, it is difficult to obtain an accurate indication of small differences between separate measurements of two devices.

It is an important object of this invention to measure radio frequency phase shift to exceptionally high accuracy.

It is another object of this invention to measure extremely small differences in both phase shift and attenuation as a function of frequency between an unknown and a standard device.

It is another object of the invention to achieve the preceding objects while presenting the results in relatively easy to utilize form.

According to the invention, first and second hybrid devices each have a parallel branch, a series branch and first and second side branches. The series branch of one hybrid device and the parallel branch of the other are terminated in impedances substantially equal to the characteristic impedance of the branches. A first side branch of one of the devices is intercoupled with a first side branch of the other of the hybrid devices by first intercoupling means including a standard device having a standard transmission characteristic in series with adjustable means, such as a first line stretcher, for controlling the degree of phase shift in the first intercoupling means. Second intercoupling means intercouples the other side branches of the hybrid devices and includes second adjustable means, such as a second line stretcher, for controlling the phase shift in the second intercoupling means and means for receiving an unknown device having an unknown transmission characteristic in series with the second adjustable means. With the unknown device coupled to the second intercoupling means and energy applied to the remaining branch of one of the hybrid devices, the remaining branch of the other of the hybrid devices provides a signal representative of the difference in transmission characteristics at the radio frequency than applied to the said one hybrid device. In fact by measuring the transfer characteristic between the said remaining branches of the two said hybrids it is possible to simultaneously accurately display both small differences in phase shift and small differences in attenuation existing between a standard network and a network test coupled between the two hybrids. Furthermore, the display may be made unusually convenient by adjusting the reference path in the transfer characteristic measuring arrangement as herein described whereby it becomes possible to simultaneously observe the changes in the differences in attenuation as well as differences in phase shift as functions of frequency.

Numerous other features, objects and advantages of the invention will become apparent from the following specification when read in connection with the accompanying drawing in which:

FIG. 1 is a two-coordinate chart suitable for displaying the difference in transmission characteristics according to the invention; and FIG. 2 is a block diagram illustrating the logical arrangement of a system according to the invention.

With reference now to the drawing and more particularly FIG. 1 thereof, there is shown a nearly rectangular coordinate chart suitable for overlaying the face of a round cathode ray tube to display the difference in transfer characteristics. The exceptionally high degree of accuracy obtainable with the invention is better appreciated by recognizing that the abscissa is marked in degrees of phase shift and the ordinate is marked in db of attenuation. Thus, full scale in phase and attenuation is $\pm 1°$ and $\pm 0.15$ db, respectively graduated into $0.1°$ intervals in phase and 0.05 db intervals in attenuation, respectively.

Referring to FIG. 2, there is shown a block diagram illustrating the logical arrangement of the preferred embodiment of phase-attenuation plotter according to the invention embodying the commercially available Alford Manufacturing Company type 14 transfer characteristic plotter. For a complete description of this apparatus reference is made to Alford Manufacturing Company Instruments and Components Catalog M-3, pp. 50–52. The type 14 plotter includes an R-F unit 11 and a presentation unit 12 for displaying the measured results. The R-F unit includes an oscillator input 13 for receiving a signal from an external oscillator 14, a source output 15 for energizing a device whose transfer characteristics is being measured, a signal input 16 for receiving the energy transmitted by the source output 15 after transmission through the device whose transfer characteristic is being measured, and a vertical output pair 17 and a horizontal output pair 18 for providing signals to the presentation unit 12 representative of vertical and horizontal deflection, respectively, of the spot to accurately indicate attenuation and phase, respectively, on the cathode ray tube face 21. These horizontal and vertical deflection signals represent respective orthogonal components of the signal applied to the signal input 16 with respect to the reference signal applied to input 39.

The comparison circuit coupled between the source output 15 and signal input 16 comprises an input hybrid A23 and an output hybrid B24 of similar transfer characteristics, a secondary standard of phase and attenuation designated standard II26 and first and second adjustable line stretchers designated line stretcher I31 and line stretcher II27. Each of the hybrids has a parallel branch, a series branch and a pair of side branches and is characterized by the property that when all the branches are terminated in their respective characteristic impedances, energy applied to one of the series and parallel branches does not reach the other but divides substantially equally between the side branches.

The source output 15 is coupled by a coaxial cable 22 to the P input of the input hybrid A23. The signal input 16 of R-F unit 11 is coupled to the S branch of the output hybrid B24 by the coaxial cable 25. Side branch II of hybrid A23 is intercoupled with side branch II of hybrid B24 by means including the standard device 26, adjustable line stretcher II27 and interconnecting coaxial cables. Similarly, side branch I of input hybrid A23 is intercoupled with the side branch I of output hybrid B24 by means including line stretcher I31, the unknown device X32 having an unknown transmission characteristic and interconnecting coaxial cables. The S branch of input hybrid A23 and the P branch of output hybrid B24 are terminated in resistances 33 and 34, respectively, each of resistances substantially equal to the characteristic impedance of those branches.

Having discussed the physical arrangement of the system, its mode of operation will be discussed. It is first convenient to assume that the transmission path between the side branches II is identical to that between the side branches I, a situation which arises when the standard device 26 and the unknown device 32 have identical characteristics, line stretcher II27 and line stretcher I31 have the same electrical length, and the electrical length of the interconnecting cables in the II—II path is the same as the electrical length of the cables in the I—I path. Energy applied to the P branch of the input hybrid A23 divides equally between the side branches I and II, and equal amounts of energy in phase coincidence reach side branches I and II of output hybrid B24. All of this energy is delivered to terminating load 34, the S branch being responsive to the difference between signals applied to the respective side branches and providing essentially no signal to signal input 16 of R-F unit 11.

When the phase shift introduced by the unknown device X32 is either somewhat less or greater than the corresponding phase shift introduced by standard device II26, the phase displaced signals applied to side branches I and II of output hybrid B provide a finite difference signal on series branch S of that hybrid representative of this phase difference. In a first approximation the amplitude of the transmitted signal is very nearly proportional to the difference in the phase shift introduced by the standard device II26 and the unknown device X32. When such a signal is transmitted, two spots are displayed on the screen 21 of the presentation unit 12. One of these spots is a stationary spot which is at the center 35 of the display. The second moving spot 36 is a function of the transfer characteristic of the unknown device X32. The distance between the two spots indicates the difference in the phase shift introduced by standard device II26 and the unknown device X32.

If this difference in phase is compensated by making an adjustment in one of the line stretchers 27 and 31, the moving spot 36 is returned to the center 35 of the display. Should the line stretcher be adjusted in the same direction somewhat farther, the moving spot 36 will pass through the center 35 to the opposite side of the chart displayed on the face 21. The line which is displayed by the moving spot under such conditions is referred to as the zero attenuation line.

When the attenuation in the unknown device X32 is different from the attenuation in the standard device II26, the moving spot 36 does not pass through the center of the display as the line stretchers are adjusted. On the contrary, the line traced on the screen is essentially then parallel to the vertical zero attenuation line passing through the center point 35. The spacing between the two lines is a measure of the difference in the attenuation of the standard device II26 and the unknown device X32.

When the phase difference is constant while the difference in attenuation is varied, the moving spot 36 travels along the line at right angles to the line plotted by varying the relative phase. Thus, one can generate the orthogonal families of lines shown in FIG. 1 (these lines are actually not straight lines but are portions of a family of large circles intersected by a family of corresponding radials) in which deflections of the spot in one plane indicate differences in phase shift while deflections in the other plane orthogonal to the one plane indicate differences in attenuation.

In general, it is found that when the adjustment of the line stretcher 27 is varied, the line described on the screen is at some angle A with respect to the horizontal. Moreover, when frequency is changed, in general, angle A changes. This behavior is usually at least inconvenient because each time the frequency is changed, one has to rotate the chart in front of the screen. It is possible to obtain a more desirable presentation by adjusting the length of the reference cable 38 connected between the output 37 of an internal matching T and the input 39 of an internal phase splitter, as shown in Fig. 16 of the aforementioned Alford Mfg. Co. Catalog M-3 on page 50 in the RF Unit, to that length which results in angle A being essentially independent of frequency at least over, say, a 20% band. The preferable adjustment is achieved by temporarily connecting one matched load to branch I of hybrid 23 and another matched load to branch I of hybrid 24 (in place of the device X and line stretcher 31) and by then adjusting the length of the reference cable 38 until the moving spot remains nearly stationary or moves only radially as frequency is varied. This adjustment is expedited by inserting a line stretcher 40 into the reference cable 38. The adjustment is based on the following observation: When the reference cable is too short the spot rotates clockwise around the center of the display. If the cable is too long the spot rotates counterclockwise. (This is true only if the connections are such that an increase in length of line stretcher 27 results in clockwise rotation of the spot.)

With the optimum adjustment of the referenced cable length, the spot remains almost stationary or moves only radially as frequency is swept. The radial movement would result if there was a change in attenuation of the "Standard II" with changes in frequency.

When the band of frequencies of interest is not too wide, it is found advantageous to make the reference cable 38 slightly longer or shorter than the optimum length in order to make the spot travel horizontally when the line stretcher 27 is adjusted and vertically when attenuation of the standard is changed. These adjustments enable one to separately change the scales for the phase shift and for the attenuation by simply adjusting the vertical and horizontal channel gain controls of the oscilloscope.

In a specific embodiment of the invention the input and output hybrids are Alford type 1027 or 2210 hybrids, the line stretchers 27 and 31 are Alford type 3764 line stretchers and the terminating impedances 33 and 34 are Alford type 1108 or 2749 load impedances.

The adjustable line stretchers are preferably calibrated so that the difference in electrical path lengths, a particular set of settings introduces, may be accurately determined. The apparatus is most advantageously employed to determine differences in transmission characteristics between a standard device and an unknown device having transmission characteristics very close to those of the standard device. The comparison method according to the invention is carried out typically by setting the line stretchers to substantially the same electrical length. If the spot is then visible on the screen 21, its position is a direct indication of the difference in attenuation and phase between standard and unknown devices. If not, the adjustable line stretchers may be adjusted until the spot appears on the screen and preferably until the difference signal provided by hybrid B24 is a minimum. This minimum condition is indicated when the spot position is closest to the center of the screen 21.

The advantage of this preferred adjustment is that the scale may then be expanded to afford extremely high resolution of transmission characteristic differences. The difference in phase is the algebraic combination of the difference represented by the difference in electrical lengths introduced by line stretchers and that indicated on screen 21. By selecting a large full scale setting for the attenuation scale and a small full scale setting for the phase scale, it is possible to effect wide changes in attenuation of the unknown device and observe small phase changes which occur as a result of such attenuation.

There has been described novel methods and means for determining transfer characteristics with exceptionally high precision rapidly and easily. It is apparent that those skilled in the art may now make numerous modifications and uses of and departures from the specific embodiments described herein without departing from the inventive concepts.

What is claimed is:

1. Signal transmission comparison apparatus comprising:
   first and second hybrid devices each having a series branch, a parallel branch and first and second side branches and characterized by the property that energy applied to one of said series and parallel branches divides substantially equally between said side branches when said branches are terminated in their respective characteristic impedances,
   means for terminating one of said series and parallel branches in each of said hybrid devices with an impedance corresponding substantially to the characteristic impedance of the branch thereby terminated,
   first means for intercoupling a first of the side branches of said first and of said second hybrid devices,
   second means for intercoupling the second of the side branches of said first and of said second hybrid devices,
   said first means for intercoupling including a standard device having a standard transmission characteristic in series with a first adjustable line stretcher for adjusting the effective electrical path length of said first means for intercoupling,
   said second means for intercoupling including a second adjustable line stretcher in series with means for receiving a device having an unknown transfer characteristic for comparison with the transfer characteristic of said standard device.

2. Signal transmission characteristic comparison apparatus in accordance with claim 1 and further comprising:
   a source of a radio frequency signal,
   means for coupling said radio frequency signal source to the remaining branch of one of said first and second hybrids whereby the remaining branch of the other of said hybrids provides a difference signal representative of the difference in transmission characteristics between said standard device and said unknown device,
   and means for providing an indication of said difference signal.

3. A method of employing the apparatus of claim 2 which method includes the steps of coupling said unknown device in series with said second adjustable line stretcher,
   and adjusting said first and second line stretchers until the signal indicated by said indicating means denotes substantial phase coincidence of energy reaching the side branches of said other hybrid device whereby the difference in the effective electrical length of said first adjustable line stretcher and said second adjustable line stretcher corresponds to the difference in phase shift between said standard device and said unknown device.

4. Signal transmission comparison apparatus comprising:
   first and second hybrid devices each having a series branch, a parallel branch and first and second side branches and characterized by the property that energy applied to one of said series and parallel branches divides substantially equally between said side branches when said branches are terminated in their respective characteristic impedances,
   first means for intercoupling a first of the side branches of said first and of said second hybrid devices,
   second means for intercoupling the second of the side branches of said first and of said second hybrid devices,
   means for varying the difference between the effective electrical path length of said first means for intercoupling and the effective electrical path length of said second means for intercoupling,
   a source of a radio frequency signal,
   means for coupling said radio frequency signal source to the remaining branch of one of said first and second hybrids whereby the remaining branch of the other of said hybrids provides a difference signal representative of the difference in transmission characteristics between a standard device and an unknown device, each in a respective one of the first and second means for intercoupling,
   and means for providing an indication of said difference signal.

5. Apparatus in accordance with claim 4 wherein the remaining branch of said one hybrid device is the parallel branch thereof and the remaining branch of said other hybrid device is the series branch thereof.

6. Apparatus in accordance with claim 5 and further comprising an R-F unit coupled to the parallel branch of said one hybrid device providing said radio frequency signal and coupled to the series branch of said other hybrid device and comprising means for providing orthogonal components of said difference signal with respect to said radio frequency signal.

7. Apparatus in accordance with claim 6 and further comprising an oscilloscope having vertical and horizontal inputs,
   and means for coupling respective ones of said orthogonal components to said vertical and horizontal inputs respectively to provide an indication on said oscilloscope representative of the magnitude and phase of said difference signal.

8. Apparatus in accordance with claim 7 and further comprising:
   a standard device and a first adjustable line stretcher comprising said first means for intercoupling,
   and an unknown device comprising said second means for intercoupling.

9. Apparatus in accordance with claim 8 and further comprising a second adjustable line stretcher comprising said second means.

10. A method of employing the apparatus of claim 9 which method includes the steps of adjusting said first and second line stretchers until the indication on said oscilloscope represents minimum magnitude of said difference signal whereby the difference in the effective electrical length of said first adjustable line stretcher and said second adjustable line stretcher corresponds to the difference in phase shift between said standard device and said unknown device.

11. A method of employing the apparatus of claim 9 which method includes the steps of adjusting said first and second line stretchers until an indication of said difference signal appears on said oscilloscope whereby the difference in the effective electrical length of said first adjustable line stretcher and said second adjustable line stretcher and the indication of phase of said difference frequency on said oscilloscope corresponds to the difference in phase shift between said standard device and said unknown device.

12. Apparatus in accordance with claim 7 and further comprising means for establishing the vector relationship between said orthogonal components and said radio frequency signal so that the indication on said oscilloscope representative of said difference signal remains essentially unchanged in the presence of variations of said radio frequency over a relatively wide range of radio frequencies.

13. Apparatus in accordance with claim 12 wherein the latter means for establishing comprises a waveguides of electrical length that establishes the last-mentioned vector relationship.

14. Apparatus in accordance with claim 13 wherein said waveguide comprises adjustable waveguide of adjustable electrical length.

15. A method of employing the apparatus of claim 14 which method includes the steps of:
varying said radio frequency,
observing said oscilloscope indication,
and adjusting the electrical length of said adjustable waveguide until the change in said oscilloscope indication in response to a change in said radio frequency is minimized.

16. Apparatus for providing an indication of the difference in transmission properties of a standard device and an unknown device having nearly equal transmission properties comprising:
differential combining means having first and second electrically isolated input branches and at least an output branch for linearly and differentially combining nearly equal signals of the same radio frequency when applied to said input branches to provide an output signal of said radio frequency of amplitude and phase related to the amplitude difference and phase difference respectively of nearly equal signals when applied to said input branches,
a source of a signal of said radio frequency,
first means for intercoupling said source with said first input branch and defining a first transmission path having first path means for adjusting the effective electrical length thereof,
second means for intercoupling said source with said second input branch and defining a second transmission path and including means for electrically isolating said first transmission path and said second transmission path,
said second transmission path including means "for receiving" said unknown device,
indicating means for indicating the difference in transmission characteristics between said first and second paths at said radio frequency,
and means for coupling said output branch to said indicating means to provide an indication of the slight difference in transmission between said first and second transmission paths when said unknown device is connected to said means for receiving and said output signal present on said output branch.

17. Apparatus in accordance with claim 16 and further comprising:
power dividing means comprising said first means for intercoupling and said second means for intercoupling for delivering substantially equal amounts of energy to said first and second transmission paths.

18. Apparatus in accordance with claim 17 and further comprising second path means for adjusting the effective electrical length of said second path which second path means is similar to said first path means.

19. Apparatus in accordance with claim 18 wherein said first path means and said second path means are like line stretchers.

References Cited

UNITED STATES PATENTS

| | | |
|---|---|---|
| 3,177,347 | 4/1965 | Cowley. |
| 2,649,570 | 8/1953 | Radcliffe _____ 324—58 XR |
| 2,790,143 | 4/1957 | Kyhl _____ 324—58 |
| 2,817,812 | 12/1957 | Fox _____ 324—58 |
| 2,817,813 | 12/1957 | Rowan et al. _____ 324—58.5 |
| 3,034,046 | 5/1962 | Sasaki _____ 324—58.5 |
| 3,060,421 | 10/1962 | Rideout. |
| 3,265,967 | 8/1966 | Heald _____ 324—58.5 XR |

RUDOLPH V. ROLINEC, Primary Examiner

P. F. WILLE, Assistant Examiner